Patented Oct. 6, 1936

2,056,794

UNITED STATES PATENT OFFICE 2,056,794

RESIN COMPOSITIONS AND PROCESS OF PREPARING SAME

Maurice L. Macht, Jersey City, and Alan F. Randolph, Montclair, N. J., assignors, by mesne assignments, to E. I. du Pont de Nemours & Company, Wilmington, Del., a corporation of Delaware No Drawing. Application April 26, 1934, Serial No. 722,483

12 Claims. (Cl. 106—22)

This invention relates to resin compositions and the process of preparing same and, more particularly, to compositions containing a thermoplastic resin of the class consisting of the polymerization products of acrylic and alkacrylic acids, their homologues and derivatives, said compositions being in granular form, or in a novel form readily adapted to be broken down into granular form, for use in molding operations, and the like, and to an improved process of preparing such compositions.

Molding compositions in granular form must fulfill certain conditions to be commercially acceptable. The ingredients of the compositions must be thoroughly blended together homogeneously to such a degree that an article subsequently molded from the mixture shall be of uniform composition and texture throughout, and of uniform color, that is, free from aggregates of undispersed coloring matter and from spots deficient in color. These compositions must be in granular to pulverulent condition to facilitate the handling. Customarily in molding shop practice the charges for the individual molds are made up by passing the granular compositions through a preforming or pelleting machine which automatically measures out a predetermined weight of the material and compresses the loose granular material into a hard and durable preform, this preform being much more readily loaded into the die than would be the material in its granular form.

Not only must the molding composition be in granular form but, in order to satisfactorily handle it in the preforming machines, it must not be too voluminous, that is to say, the granular material must have a sufficiently high bulk density, by which term is meant the apparent density of a granular molding compound in an untamped, loose condition, generally expressed in weight per unit volume as in the mixed term grams per cubic inch. The granular material must be in such condition as to feed readily by gravity from the hopper to the cavity of the pelleting machine and must not contain an undue proportion of fines which tend to cause the jamming of the plunger in the cavity of the pelleting machine by building up in the narrow clearance provided between them. Moreover, the granular material must not contain any individual particles of comparatively large size, as then the operation of the pelleting machine will be defective in that the automatic device which levels off the individual charge of material in the cavity will not accurately level material containing very coarse particles.

In an application for United States Patent by Daniel E. Strain, entitled "Method of treating plastics", Serial No. 722,489 filed of even date herewith, and in another application for United States Patent by the present applicants, entitled "Process of preparing resin compositions", Serial No. 722,482 filed of even date herewith, are disclosed processes whereby resins of the type herein considered are obtained in fully colloided plastic masses. Such masses may be broken down into granular form to give a molding powder acceptable in the trade. Prior to these disclosures the preparation of resins of this type for use in molding powders does not seem to have been given consideration and, in so far as applicants know, there was no other method known which was specifically adapted for the production of these molding powders. Although the processes disclosed in the United States applications above referred to are fully capable of producing an acceptable molding powder, there is room for improvement in these processes from the point of view of economical operation, production of molding powders, and the like, containing ingredients particularly sensitive to high temperatures, and elimination of the difficulties met in reducing the fully colloided material while still hot from the kneading operation into granular form.

An object of the present invention is to provide a simple and economical process of preparing compositions containing thermoplastic resins of the class consisting of the polymerization products of acrylic and alkacrylic acids, their homologues and derivatives. A further object is to provide a process which reduces the degree of kneading of the resin composition and extent of exposure to elevated temperature thereof necessary in the processes discussed above. A still further object is to provide a process wherein a new homogeneous resin composition is produced that may be readily broken down into granular form while still at an elevated temperature from the processing. Other objects of the invention will be apparent from the description given hereinafter.

The above objects are accomplished according to the present invention by kneading a comminuted thermoplastic resin from the class consisting of the polymerization products of acrylic and alkacrylic acids, their homologues and derivatives, with or without auxiliary ingredients, and stopping said kneading when the resin is formed into a substantially homogeneous, cellulous, friable mass which is more or less spongy and non-transparent. The mass is characterized by being readily friable even while still hot from the kneading operation and it is in a state of incipient or semi-colloidalization as compared to the colloided, tough, horny resin compositions which are characterized by being not friable when warm and, in many cases, difficultly friable even when cool and which are continuous in physical structure and transparent in thin films in the absence of fillers, pigments, or other insoluble matter. The plastic mass produced according to the present invention, besides obviously not being fully colloided throughout, is distinctly cellulous, that is, it contains innumerable small cells or cavities. Despite this characteristic cellulous structure, the mass is well compacted and, when broken into granular form, has a satisfactorily high bulk density.

The invention is broadly applicable to thermoplastic resins of the class consisting of the polymerization products of acrylic and alkacrylic acids and their derivatives and homologues, such as the nitriles, amides, substituted alkyl and substituted aryl derivatives of the acids and, particularly, the esters of the acids such as the alkyl esters of acrylic acid, methacrylic acid, ethacrylic acid, and the higher homologues. Specific resins included are the polymerization products of methyl and ethyl methacrylate and methyl and ethyl ethacrylate. These resins may be used singly or a mixture of two or more may be employed. Of this class of resins it is preferred to employ polymerized methyl methacrylate, whose preparation is disclosed in Rowland Hill application Serial No. 641,113, filed November 3, 1932. These thermoplastic resins need not be one hundred percent polymers of the monomer from which they are made and ordinarily contain some monomer. The presence of an appreciable proportion of monomer, for example, 10-45%, will increase the thermoplasticity of the resin and, for certain purposes, may be found advantageous.

In a preferred form, the invention comprises kneading in a masticator mixer under positive pressure a mixture comprising a resin of the type herein considered and a plasticizer therefor, (usually with the addition of coloring matter), stopping the kneading when the mixture is formed into a substantially homogeneous, friable, cellulous mass, removing said mass from the mixer and breaking it down to granular form without necessarily allowing it to cool.

Although the invention is broadly applicable to the use of any mixing machine which will give a thorough kneading of the plastic, such as the colloid rolls, screw stuffer, and the like, masticator mixers are peculiarly well adapted for this purpose due to the fact that the severe kneading action which they give quickly brings the plastic mass into the friable, cellulose state desired, while at the same time homogeneously incorporating therein plasticizers, coloring matter, fillers, and the like, without the necessity of exposing the plastic mass to excessively high temperatures or to any high temperature for more than a few minutes. Where the resin has pronounced thermoplasticity, as is characteristic of the resins herein considered, plasticizers may be omitted entirely, if desired, and volatile solvents are entirely unnecessary in so far as the operation of this invention is concerned.

Masticator mixers are well known in the art, the so-called "Banbury" mixer being a prominent example. The masticator mixer comprises a working space within which rotate the mixing blades, ordinarily two in number, which are designed to have very small clearance with the wall of the working space. The mixer comprises further a ram, actuated by compressed air, or the like, which bears down upon the charge of material being mixed and forces the material to pass through the narrow clearances above mentioned with the result that the material is subjected to a very severe masticating action quite peculiar to this type of apparatus. The pressure ram could be replaced by any equivalent means for insuring that the plastic mass being kneaded is forced down between the blades of the mixer and the wall of the working space, rather than merely riding around with the blades and avoiding the kneading action. The term "under positive pressure" is used herein in its customary sense in this art, namely, that a pressure ram or equivalent device, is forcing the mixture down into the narrow clearance between the blades of the mixer and the adjacent walls so that the material is subjected to a very severe kneading action. In the specific examples given hereinafter a pressure of 10-50 pounds per square inch of ram surface was exerted on the pressure ram but it is to be understood that there is nothing critical about the pressure exerted on the ram and, consequently, upon the material in the mixer, so long as the material is prevented from merely riding around with the blades of the mixer and avoiding kneading action. The pressure on the ram, or equivalent device, will undoubtedly vary widely depending upon the size and design of masticator mixer which is employed.

In carrying out the present invention in its preferred form, the resin in question in comminuted but not necessarily pulverulent form, together with any auxiliary ingredients in desired proportions, is introduced into a masticator mixer in sufficient quantity so that the working space of the mixer is filled to such a point that the pressure ram of the mixer will operate to exert positive pressure upon the contents during the kneading action and thus force the material into the narrow clearances as desired. The mixer is set into motion with the pressure ram in operating position to exert positive pressure upon the mass within the mixer. The severe masticating action effects a homogenization of the mixture and also produces considerable heat, as a result of internal friction within the material, so that the mass would ultimately reach what is known to the art as a fully colloided condition. However, in operating according to this invention, the kneading is stopped when the mixture is formed into a homogeneous, friable, cellulous mass. This condition is reached somewhat sooner in kneading than the fully colloided mass is reached and, practically, it may be conveniently recognized by the squealing of the mixer and a strong tendency for the pressure ram to rise. The mass is discharged from the masticator mixer usually in lumps of various sizes which may be readily reduced by grinding to granular form suitable for molding powders without any cooling period whatsoever.

The kneading cycle according to this invention is a matter of only a few minutes and, of course, it is invariably shorter than the kneading cycle necessary for obtaining a fully colloided mass, even in this type of mixer, which requires rarely more than 15 minutes' operation to form a fully colloided homogeneous mass.

The following examples illustrate specific embodiments of the invention, parts being given by weight:—

*Example 1.*—A mixture of 100 parts of polymerized methyl methacrylate resin, 26 parts of diamyl phthalate as a plasticizer therefor, and 2 parts of stearic acid as a mold lubricant, was loaded into a Banbury mixer in such a quantity that, when the blades were set in motion and the pressure ram brought into operating position, the ram would exert positive pressure upon the charge so as to force it into the clearances between the blades and the walls of the mixer. The blades were set into motion, the pressure ram brought into operating position and the mixing continued until the charge had reached the condition of a substantially homogeneous, cellulous, friable mass. The kneading required about three minutes and the temperature of the mass, as discharged from the mixer immediately upon completion of the kneading cycle, was between 68–74° C. The material as discharged from the mixer in lumps was immediately passed through a three-roll grinding mill without cooling. There was thus produced a granular product having a bulk density of 7.7 grams per cubic inch and a screen analysis as follows:

*Screen analysis*

|  | Percent |
|---|---|
| On 10 mesh | 17.1 |
| On 20 mesh | 75.3 |
| On 40 mesh | 6.0 |
| On 60 mesh | 0.9 |
| On 80 mesh | 0.4 |
| On 100 mesh | 0.2 |
| Through 100 mesh | 0.1 |

The granular material was satisfactory for molding articles under heat and pressure which were homogeneous in appearance and uniformly strong and evenly textured.

*Example 2.*—A mixture of 100 parts of polymerized methyl methacrylate resin and 2 parts of stearic acid was loaded into a Banbury mixer and processed in the same manner as in Example 1. A substantially homogeneous, cellulous, friable mass was obtained when the temperature of the charge had reached about 143° C., which occurred after 11 minutes kneading. In this example no plasticizer was used, thus necessitating a somewhat longer kneading cycle than in Example 1 and an appreciably higher temperature. The resulting mass was granulated, without cooling, by grinding and gave a satisfactory molding powder.

*Example 3.*—A mixture of 100 parts of polymerized methyl methacrylate resin, 11.3 parts of tributyl phosphate as a plasticizer therefor, and 0.6 part of stearic acid, was loaded into a Banbury mixer and worked as in Examples 1 and 2, the kneading being stopped when the mixture reached a substantially homogeneous, cellulous, friable mass. A molding powder was obtained which could be molded into articles of satisfactory appearance and strength.

*Example 4.*—A mixture of 100 parts of polymerized methyl methacrylate resin, 5.3 parts of diamyl phthalate, and 0.5 part of stearic acid was loaded into a Banbury mixer and treated as in the preceding examples, the kneading being stopped when the mixture was formed into a substantially homogeneous, cellulous, friable mass, which was readily reducible to granular condition without cooling. Articles molded from this powder showed entirely satisfactory properties.

The above examples are merely illustrative of the invention, which broadly includes kneading in any type of mixer which will give a thorough kneading action, any one or more of the resins disclosed, with or without other ingredients, and stopping said kneading when the mixture is formed into a substantially homogeneous, cellulous, friable mass which may be broken down without cooling into granular form for use as a molding powder, or may be subjected to known plastic processes such as rolling, slabbing, cake pressing, extruding, dope making, and the like.

The resin preferably should be in fairly finely divided form, although not necessarily pulverulent, in order that homogenization of the composition may not be unduly delayed by the need of breaking down coarse particles. Obviously the resin may very well be used in the form of coarse particles if its physical condition is such that it would be practically immediately broken down into finely divided form upon setting the mixer in motion.

Auxiliary ingredients may be added to the resin such as would be used for the ordinary purpose of modifying the resin with respect to color, rigidity, mechanical strength, electrical properties, and the like, to meet the requirements of use of the ultimate product made therefrom. In ordinary commercial operation coloring ingredients and plasticizers would be used. The coloring ingredients may be pigments or dyestuffs and it has been found that no special provision is necessary for preliminary preparation of coloring ingredients. Usually the mixture to be introduced into the Banbury is formed by adding the ingredients to some ordinary light construction mixing device to give a preliminary mixing and it has been found that, if coloring matter is merely introduced in a dry condition into this preliminary mixer, the coloring matter will be uniformly distributed throughout the plastic composition at the end of the kneading cycle in the masticator mixer. Certain pigment colors are more refractory in this respect, tending to resist dispersion by the kneading action and to remain in agglomerated form, distributed throughout the mass, so as to produce a non-uniform or speckled appearance. When dealing with such pigments, or, for example, when dealing with a plastic mixture which is so readily kneaded to an otherwise homogeneous, cellulous, friable condition as to allow insufficient time for the dispersion of the coloring matter, it is desirable to subject the coloring matter to a special preliminary treatment to promote its dispersion, such as grinding it either alone or with all or a portion of one of the other ingredients of the molding compound to be made. It is by no means necessary that the ingredients be given any preliminary mixing before introduction into the masticator mixer but such preliminary mixing is usually found convenient.

A large number of plasticizers are suitable for use in these compositions, among which are the following:—camphor; phthalates, such as ethyl, propyl, isopropyl, butyl, isobutyl, cyclohexyl, methyl cyclohexyl, methoxyethyl, ethoxyethyl, or benzyl phthalate or phthalates of the mixed type such as cyclohexyl butyl, benzyl butyl, or butyl lauryl phthalate; esters of dibasic acids, such as the ethyl, propyl, isopropyl, butyl, isobutyl, cyclohexyl, methyl cyclohexyl or benzyl esters of succinic, fumaric, tartaric, adipic, methyladipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g., glycol and glycerol, such as glycol benzoate, glycol laevulinate, triacetin, tripropionin and tributyrin; substituted toluene sulphonamides, such as ethyl paratoluenesulphonamide; substituted amides, such as tetraethyl phthalamide, tetrabutyl succinamide, tetrabutyl adipamide, tetraethyl phthalamide; hydrocarbons, such as dixylyl ethane; halogenated hydrocarbons, such as chlorinated diphenyls and dichlordibenzyl; ether compounds such as dicresoxy ethyl ether; and phosphates such as triphenyl and tricresyl phosphates.

As distinguished from application for United States patent by the present applicants entitled "Process of preparing resin compositions", filed of even date herewith, the kneading of the plastic must be stopped at the point where it is formed into a substantially homogeneous cellulous, friable mass in order to practice the present invention and derive any benefit therefrom, rather than continuing the kneading until a colloided mass is obtained. Although the resin according to the present invention is obviously not completely colloided when it reaches the cellulous friable state, it is in a state of incipient colloidalization, or a so-called semi-colloided state, and this is important in obtaining a molding powder of satisfactorily high bulk density.

The homogenization of the mixture is directly a result of the kneading action to which it is subjected and the degree of homogenization is primarily a function of the time of mixing, although it is true that homogenization is facilitated by the incipient colloidalization of the resin which results from the heat developed during the kneading cycle. On the other hand, the semi-colloiding of the mass, that is, the formation of the cellulous, friable mass, is dependent primarily upon the temperature to which the mass is carried and very little upon the time of mixing. In order that any given mixture shall reach the cellulous, friable state it is, in general, requisite that it should be subjected to a certain minimum temperature. The ease with which a given mixture is rendered homogeneous will be dependent, inter alia, upon the character and initial fineness of the ingredients. The ease with which a given mixture will reach the cellulous, friable state, under given conditions of rise of temperature, (or conversely, the temperature required to effect the cellulose friable formation), will depend, inter alia, upon the softening temperature of the resin, upon the strength of solvent action developed by any plasticizer which may be used, (e. g., upon the character and proportion of the plasticizer), upon the proportion of inert ingredients, (e. g., fillers, pigments, etc.), and upon the characteristic influence of any other ingredient which may be involved.

Accordingly, the process may be controlled by suitable heating or cooling of the mixing apparatus and by control of the size of the charge put into it, so that homogenization and the development of the cellulous, friable state will be effected in a minimum time and at a minimum temperature. If, for example, under certain conditions the mixture tends to heat up quickly to a temperature beyond that required for the formation of the cellulous, friable mass and, consequently, tends to pass on to a fully colloided mass in a period of time insufficient to effect homogenization, the obvious remedy is to start the operation with the mixer at a lower temperature, or to apply cooling means during the processing, so that the formation of the cellulous, friable mass will be effected approximately at the same time as the mass becomes substantially homogeneous. In general, the heat required for effecting the formation of the homogeneous, cellulous, friable mass is derived for the most part from the internal friction of the plastic mass and the application of heat from external sources is frequently unnecessary and, when employed, must be used with care in order that the mixture does not pass on to a fully colloided mass prior to homogenization.

On the other hand, if, for example, under certain conditions the mass tends to become fully homogeneous before the cellulous, friable state is reached, then the mixture may be heated initially or during the kneading in order that the minimum temperature for formation of the cellulous, friable mass of the particular mixture involved may be reached more quickly and consequently formation of the cellulous, friable mass speeded up so that it will be effected at approximately the same time the material becomes substantially homogeneous.

The homogeneous, cellulous, friable mass as removed from the masticator mixer is, of course, at an elevated temperature, usually at least 65° C. A peculiar and unexpected characteristic of this cellulous mass is that it may be readily broken down into granular form while at this elevated temperature and, in fact, is slightly more friable at this temperature than when cooled down to room temperature, consequently, as it is advantageous to eliminate the cooling period, it is preferred that the cellulous mass be reduced to granular form immediately upon removal from the mixer without cooling. Grinding may be done by any of the known means such as a hammer mill, a rotary mill, a three-roll mill, or the like.

Fillers such as China clay, terra alba, gypsum, asbestos, wood flour, cottonflock, and the like; effect materials such as bronze powders, pearl essence, and the like; lubricants such as stearic acid, metallic soaps, e. g., aluminum palmitate and calcium stearate; and waxes, e. g., carnauba and candelilla wax; and other miscellaneous ingredients such as natural resins, other synthetic resins, and the like, may be included in the composition to be processed according to the present invention. The inclusion of such ingredients and the proportions thereof will be determined by the particular properties desired in the finished composition and not with relation to the working of the process of the present invention.

Among the advantages of the present invention over that of the process most closely approximating it, namely, that disclosed in application for United States patent by the present applicants entitled "Process of preparing resin compositions", and filed of even date herewith, is the fact that, in the present process, the cellulous material produced is so readily disintegrated into granular form even while hot. A further advantage of the present process is that the duration of exposure of the material during kneading to elevated temperatures is, in every instance, less than the time required where a colloided mass is being formed, as in applicants' copending application. This permits the use of materials particularly sensitive and easily injured by heat that could not safely be used in any of the processes involving the formation of colloided material. It will thus be seen that the present process not only results in economy of operation as to power consumed, production per unit per day, and economy in grinding, but also permits the use of a wider range of ingredients in the plastic masses.

As many apparently widely different embodiments of this invention may be made without departing from the spirit and scope thereof, it is to be understood that the invention is not limited to the specific embodiments thereof except as defined in the appended claims.

We claim:

1. Process of preparing molding compositions comprising kneading in the absence of volatile solvent in a masticator mixer under positive pressure a hard, dry comminuted thermoplastic resin from the class consisting of the polymerized esters of acrylic and alkacrylic acids, stopping said kneading when said resin is formed into a substantially homogeneous, compacted, coherent, cellulous, friable mass, and breaking said mass down into granular form.

2. Process of preparing molding compositions comprising kneading in the absence of volatile solvent in a masticator mixer under positive pressure a mixture comprising a hard, dry, comminuted thermoplastic resin from the class consisting of the polymerized esters of acrylic and alkacrylic acids, and a plasticizer for said resin, stopping said kneading when said resin is formed into a substantially homogeneous, compacted, coherent, cellulous, friable mass, and breaking said mass down into granular form.

3. Process of preparing molding compositions comprising kneading in the absence of volatile solvent in a masticator mixer under positive pressure a hard, dry comminuted polymerized methyl methacrylate resin, stopping said kneading when said resin is formed into a substantially homogeneous, compacted, coherent, cellulous, friable mass, and breaking said mass down into granular form.

4. Process of preparing molding compositions comprising kneading in the absence of volatile solvent in a masticator mixer under positive pressure a mixture comprising a hard, dry, comminuted polymerized methyl methacrylate resin and a plasticizer therefor, stopping said kneading when said resin is formed into a substantially homogeneous, compacted, coherent, cellulous, friable mass, and breaking said mass down into granular form.

5. In the process of preparing molding powders, the steps of kneading in the absence of volatile solvent a hard, dry, comminuted thermoplastic resin from the class consisting of the polymerized esters of acrylic and alkacrylic acids, and stopping said kneading when said resin is formed into a substantially homogeneous, compacted, coherent, cellulous, friable mass.

6. In the process of preparing molding powders, the steps of kneading in the absence of volatile solvent a mixture comprising a hard, dry, comminuted thermoplastic resin from the class consisting of the polymerized esters of acrylic and alkacrylic acids, and a plasticizer for said resin, and stopping said kneading when said mixture is formed into a substantially homogeneous, compacted, coherent, cellulous, friable mass.

7. In the process of preparing molding powders, the steps of kneading in the absence of volatile solvent a hard, dry, comminuted polymerized methyl methacrylate resin, and stopping said kneading when said resin is formed into a substantially homogeneous, compacted, coherent, cellulous, friable mass.

8. In the process of preparing molding powders, the steps of kneading in the absence of volatile solvent a mixture comprising a hard, dry, comminuted polymerized methyl methacrylate resin and a plasticizer therefor, and stopping said kneading when said mixture is formed into a substantially homogeneous, compacted, coherent, cellulous, friable mass.

9. Product comprising a thermoplastic resin from the class consisting of the polymerized esters of acrylic and alkacrylic acids, said product being substantially homogeneous, cellulous, and friable at temperatures above room temperature and adapted to be granulated to give a molding composition having a bulk density of about 7.7 grams per cubic inch at a screen analysis of:

| | Percent |
|---|---|
| On 10 mesh | 17.1 |
| On 20 mesh | 75.3 |
| On 40 mesh | 6.0 |
| On 60 mesh | 0.9 |
| On 80 mesh | 0.4 |
| On 100 mesh | 0.2 |
| Through 100 mesh | 0.1 |

10. Product comprising a thermoplastic resin from the class consisting of the polymerized esters of acrylic and alkacrylic acids, and a plasticizer for said resin, said product being substantially homogeneous, cellulous, and friable at temperatures above room temperature and adapted to be granulated to give a molding composition having a bulk density of about 7.7 grams per cubic inch at a screen analysis of:

| | Percent |
|---|---|
| On 10 mesh | 17.1 |
| On 20 mesh | 75.3 |
| On 40 mesh | 6.0 |
| On 60 mesh | 0.9 |
| On 80 mesh | 0.4 |
| On 100 mesh | 0.2 |
| Through 100 mesh | 0.1 |

11. Product comprising a polymerized methyl methacrylate resin, said product being substantially homogeneous, cellulous, and friable at temperatures above room temperature and adapted to be granulated to give a molding composition having a bulk density of about 7.7 grams per cubic inch at a screen analysis of:

| | Percent |
|---|---|
| On 10 mesh | 17.1 |
| On 20 mesh | 75.3 |
| On 40 mesh | 6.0 |
| On 60 mesh | 0.9 |
| On 80 mesh | 0.4 |
| On 100 mesh | 0.2 |
| Through 100 mesh | 0.1 |

12. Product comprising a polymerized methyl methacrylate resin and a plasticizer therefor, said product being substantially homogeneous, cellulous, and friable at 65° C. and adapted to be granulated to give a molding compound having a bulk density of about 7.7 grams per cubic inch at a screen analysis of:

| | Percent |
|---|---|
| On 10 mesh | 17.1 |
| On 20 mesh | 75.3 |
| On 40 mesh | 6.0 |
| On 60 mesh | 0.9 |
| On 80 mesh | 0.4 |
| On 100 mesh | 0.2 |
| Through 100 mesh | 0.1 |

MAURICE L. MACHT.
ALAN F. RANDOLPH.